United States Patent [19]

Hebbrüggen

[11] Patent Number: 4,813,311
[45] Date of Patent: Mar. 21, 1989

[54] CENTER DRIVE MACHINE

[75] Inventor: Norbert Hebbrüggen, Eschenbach, Fed. Rep. of Germany

[73] Assignee: EMAG Maschinenfabrik GmbH, Fed. Rep. of Germany

[21] Appl. No.: 61,909

[22] Filed: Jun. 11, 1987

[30] Foreign Application Priority Data

Jun. 16, 1986 [DE] Fed. Rep. of Germany ....... 3620231

[51] Int. Cl.$^4$ .............................................. B23B 3/00
[52] U.S. Cl. .................................................. 82/117
[58] Field of Search .................. 82/2 R, 3, 28 R, 30, 82/8, 21 R, 14 R, 32, 40 R, 9, 33 A, 2.5, 2.7, 14 A, 2 B, 4 C, 4 D, 4 E

[56] References Cited

U.S. PATENT DOCUMENTS

| | | | |
|---|---|---|---|
| 1,571,323 | 2/1926 | Cole et al. | 82/8 |
| 1,571,331 | 2/1926 | Hagman | 82/8 |
| 3,442,166 | 5/1969 | Pope et al. | 82/8 |
| 3,937,110 | 2/1976 | Renoux | 82/2 R |
| 4,064,774 | 12/1977 | Maddock | 82/8 |
| 4,207,785 | 6/1980 | Grels | 82/2 R |
| 4,405,226 | 9/1983 | Hansen et al. | 82/2 R |
| 4,445,405 | 5/1984 | Champeau | 82/3 |

Primary Examiner—Frederick R. Schmidt
Assistant Examiner—Blynn Shideler
Attorney, Agent, or Firm—Darby & Darby

[57] ABSTRACT

The center drive machine comprises on each machine bed half a center drive headstock for seating and driving the workpiece and in each instance a tool holder slide for the uptake of tools. Both machine units are movable on the same machine bed. For setting the machine according to the workpiece length and for executing the work cycle, both machine units are movable on the machine bed by means of a single drive unit, the drive unit being disposed at one of these machine units and engaging at the other machine unit. For moving the machine units along the machine bed, one machine unit is clamped to the machine bed, allowing the drive to brace itself against this clamped machine unit and the other machine unit to move. The drive unit comprises a servomotor and a spherical roller spindle. After extension of the total length of the spherical roller spindle, the previously clamped machine unit is released and the other machine unit clamped relative to the machine bed, so that then the previously clamped machine unit can be moved. By means of the drive unit, not only the moving of the machine units in rapid motion but also the feed during machining is carried out.

5 Claims, 3 Drawing Sheets

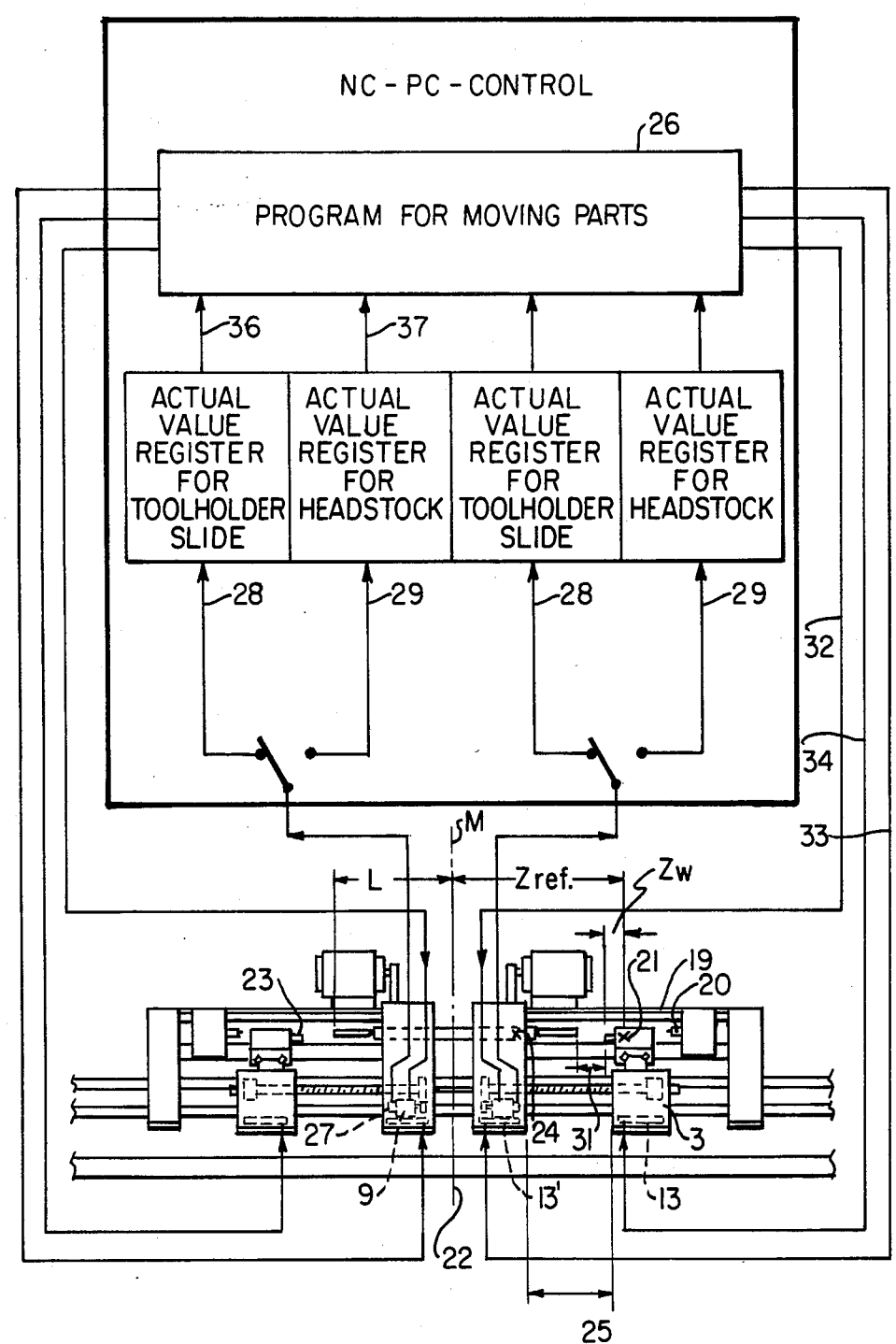

CENTER DRIVE MACHINE

FIELD OF THE INVENTION

The invention relates to a center drive machine with two center drive headstocks movable on a machine bed and with two tool holder slides movable on the same machine bed, of which one headstock and one tool holder slide is associated in each instance with one machine bed half.

BACKGROUND OF THE PRESENT INVENTION

In machines of this kind, when workpieces of different lengths are being machined, the two headstocks which jointly receive, clamp and drive the workpiece must be moved against or relative to each other in order for the workpiece to be clamped at its end to the extent possible. In this connection, it is necessary that each tool holder slide associated with a headstock must also be moved for it to be at the necessary distance from the headstock when machining of the workpiece starts.

For the displacement of these two machine units on each machine bed half, there have been known and used spherical roller spindles drivable by servomotors in order to be able to move the respective machine unit. Long spherical roller spindles not only require a high cost for their manufacture but also present difficulties with respect to their protection against fouling by coolants and chips while being used in the machine. Also, rack and pinion drives have been employed, which again are susceptible to dirt and involve a correspondingly high expense when using covers and protective devices.

It is an object of the invention to develop a center drive machine so that the headstock and the tool holder slide of each machine bed half are displaceable by means of a simple drive system and are, moveover, controllable in a simple manner.

SUMMARY OF THE PRESENT INVENTION

In accordance with the invention, in a center drive machine with two center drive headstocks moveable on a machine bed and with two tool holder slides movable on the same machine bed, one headstock and one tool holder slide being associated in each instance to one machine bed half, the improvement comprising that one headstock and one tool holder slide are movable in each instance by a single common drive unit which is disposed on one of the two and acts on the other of the two, the tool holders slide being fixed relative to the machine bed when the headstock is being moved, and the headstock being fixed relative to the machine bed when the tool holder slide is being moved.

The coupling of the headstock and tool holder slide of one machining side of the machine bed via a single common drive unit, which permits moving both machine units by the fact that in each instance one of these two machine units is clamped relative to the machine bed, makes possible a very quick adjusting and retooling of the machine, the mutual clamping of each machine unit relative to the machine bed making possible a short drive spindle between these two machine units and a servomotor controllable in a simple and exact manner.

A preferred embodiment of the invention provides that the drive unit comprises a spherical roller spindle, a nut cooperating with the spherical roller spindle, and a drive motor for generating a rotary motion between the spherical roller spindle and nut.

The spherical roller spindle used need not have anywhere near the length of half the machine bed, as would be necessary if the two machine units would not be mutually clampable, but instead a length suffices which allows the two machine units to be moved alternately relative to each other, owing to which this spherical roller spindle can be kept very short, as it is possible to run through even large distances along the machine bed in so-called alternate motion, in which the machine units are alternately clamped relative to the machine bed and whichever is the loose machine unit is moved.

For the clamping of the headstock and of the tool holder slide on the machine bed, these machine units comprise in each instance at least one fixing system, which is formed as a hydraulically operated bottom strip and engages from below a guide strip formed at the machine bed.

By using preferably three-phase current operated servomotors in conjunction with a microprocessor control, each setting process can be carried out without limit switches or cams, and the paths to be traveled in the work cycle and in setting the machine can be traversed quickly, owing to which the nonproductive times are shortened considerably. Through the use of a microprocessor control with closed position control circuit, the excursions can be preprogrammed and maintained exactly. By this microprocessor control also the clamping operations necessary for moving the machine units are controlled.

An advantageous feature of the invention consists in that the headstock as well as the tool holder slide manage with a common measuring system for carrying out the work cycle. The commands for moving the headstock or the tool holder slide are preset numerically and the computer of the microprocessor control not only takes the direction logic into account when the headstock or the tool holder slide is being moved, but also adds or subtracts dimensions to be able to move both machine units not only at a certain location but for example also for carrying out the switching from fast motion to feed.

BRIEF DESCRIPTION OF THE DRAWINGS

The invention will now be explained with reference to an embodiment illustrated in the drawing, in which:

FIG. 5, a diagram of the programmed processing of the machine movements.

DESCRIPTION OF THE PREFERRED EMBODIMENTS

Figure 1:
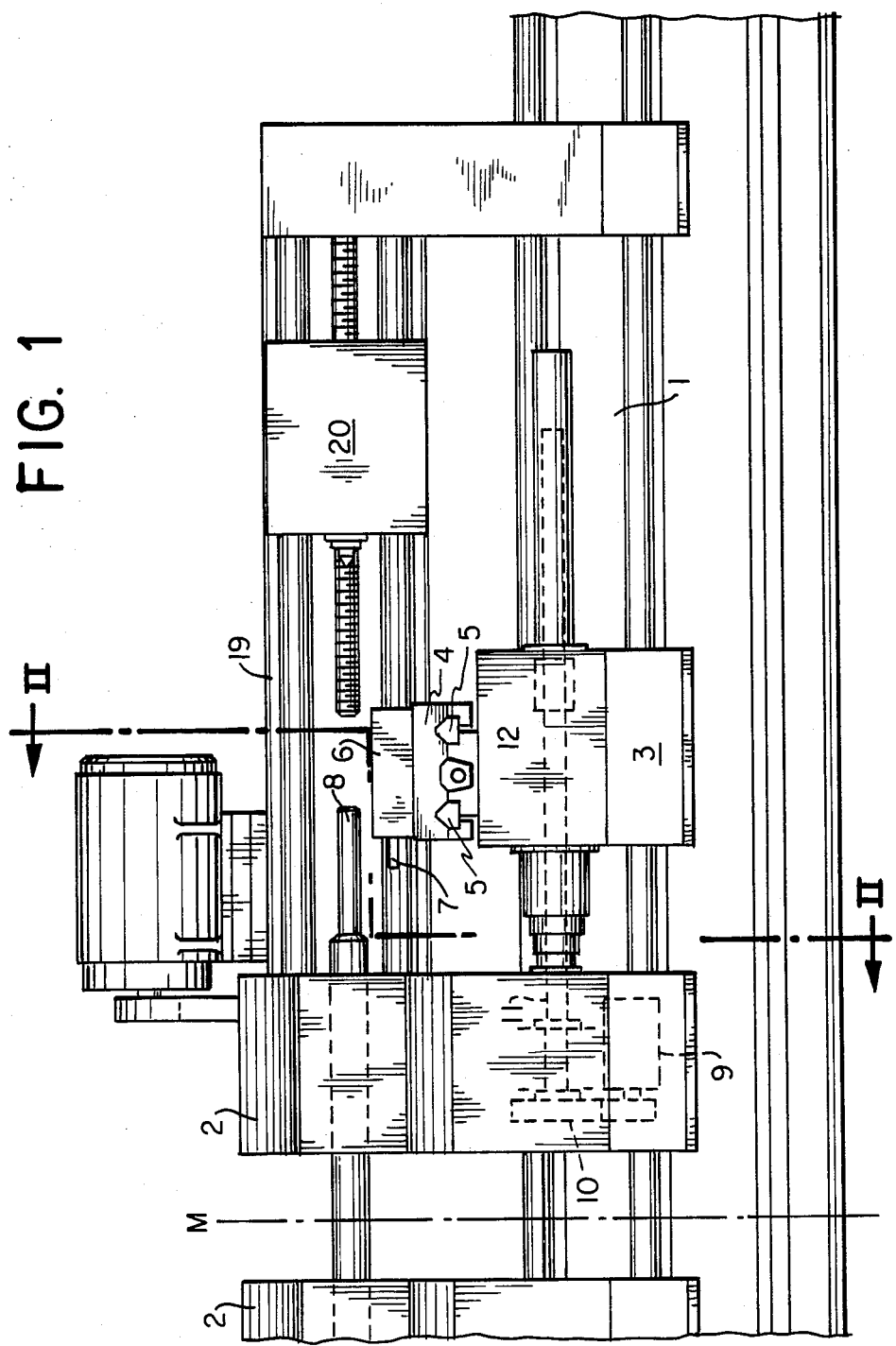
FIG. 1 shows a diagram of one half of a center drive machine.
Figure 2:
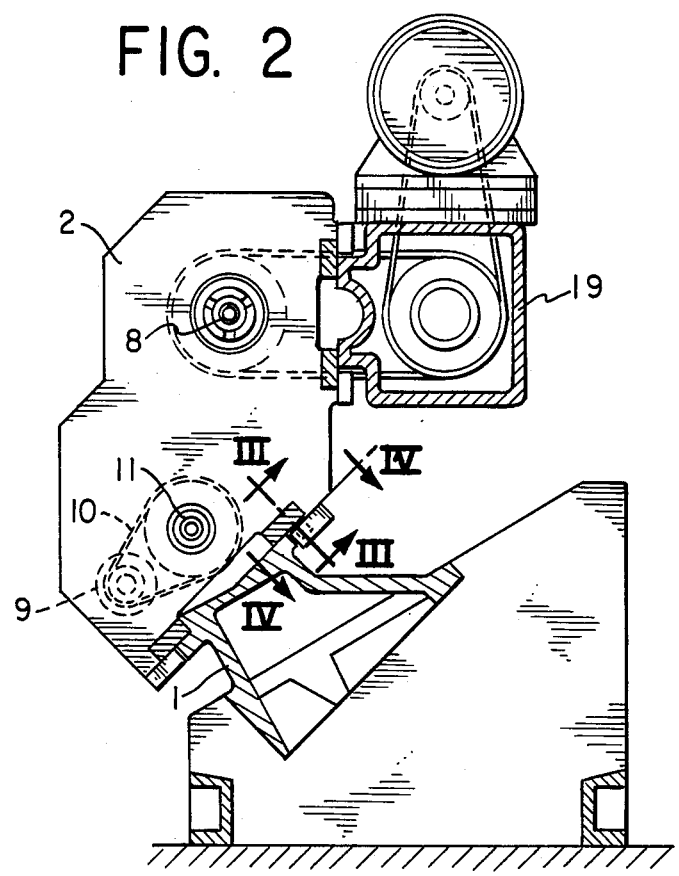
FIG. 2, a section along line II—II in FIG. 1.
Figure 3:
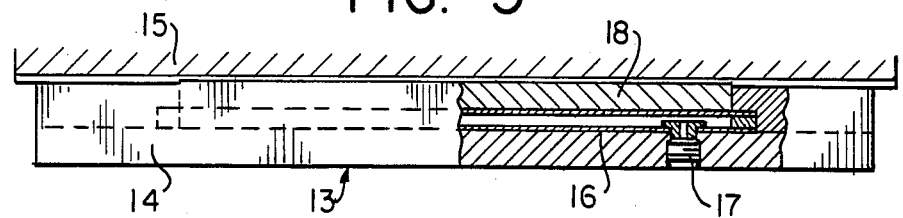
FIG. 3, a section along line III—III in FIG. 2 on a larger scale.
Figure 4:
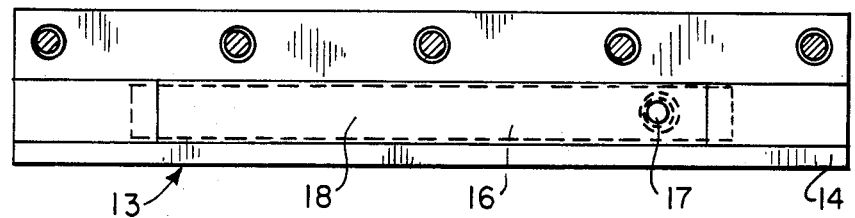
FIG. 4, a section along line IV—IV in FIG. 2 on a larger scale.

As can be seen from FIG. 1, on a machine bed of each machine bed half are movable a center drive headstock 2 and a tool holder slide 3, the machine bed center being indicated by a dash-dot line M. The construction shown in FIG. 1 exists in mirror symmetry to the left of this center line in the same way. Each headstock 2 is guided on the machine bed 1 in the manner of a slide. The tool holder slide 3 carries a slide 4 which moves on a guide 5 which is arranged crosswise to the machine bed 1 on the tool holder slide 3, and is provided with a tool turret 6 carrying tools 7. For setting the tools 7 against a workpiece 8, the slide 4 is movable on the guides 5 perpendicular to the longitudinal direction of the machine. The workpiece 8 is clamped in both center drive headstocks 2 and is driven by both headstocks simultaneously.

For setting the machine and for performing a work cycle, it is necessary to adjust the headstocks and the tool holder slides on the machine bed 1 in accordance with the workpiece length, and it is necessary to move the headstock in order to set the distance between the two headstocks according to the length of the workpiece, while the tool holder slide must execute during the work cycle movements in the direction of the longitudinal axis of the work piece as the latter is being machined.

To carry out these movements, there is provided in each headstock 2 a servomotor 9, preferably operated with three-phase current, which via a gear train 10 sets into rotation a spherical roller spindle 11 which in the tool holder slide 3 passes through a nut 12 retained in the tool holder slide 3. If the spherical roller spindle 11 is rotated in one direction, the two slides 2 and 3 move away from each other, while when it is rotated in the other direction, the two slides are moved toward each other. To make possible a controlled movement of one of the two slides or machine units, there are provided on each of these slides fixing systems 13, 13', each of which is disposed in a bottom strip 14 which engages from below a guide strip 15 formed at the machine bed.

The fixing system 13, 13' comprises a sealed membrane 16 with a hydraulic connection 17 which presses a clamping strip 18, which is displaceably guided in the bottom strip 14, against the guide strip 15 when hydraulic oil is supplied into the interior of the membrane 16 through the connection 17.

In the drawing, an additional guide 19 for a tailstock 20 is provided parallel to each machine bed 1.

The programmed processing of the mutual moving of the two machine units of each bed side is evident from FIG. 5. The movement sequence of the individual machine units, i.e. of the tool holder slide and of the headstock, is controlled by an NC-PC control of the machine tool.

At the beginning of a machining operation, the first machine unit, i.e. the tool holder slide 3, of each bed side is brought into the outer starting position, its reference point 21 to the center plane 22 of the machine bed having the distance $Z_{ref}$. The distance of the tool tip 23 from the reference point of the tool holder slide 3 is designated by $Z_w$. The second machine unit, the headstock 2, is spaced from the tool holder slide 3 at the maximum distance possible on the basis of the working length of the spherical roller spindle 11. Its reference point 24 has a distance from the center plane 22 which is smaller by the possible mutual displacement path than corresponds to the distance of reference point 21 from the center plane 22. The possible displacement path which corresponds in the representation of FIG. 5 to the illustrated free spacing between the machine units is labeled 25. The length of the workpiece 8, referred to one machine bed side, i.e. the distance from one end of the center plane 22, is marked L. In the parts program, which is symbolized by the rectangle 26, the length L of the workpiece is stored, to be able to bring the tool holder slide 3 and the headstock 2 into the correct position for the machining of the workpiece 8. For this purpose, there is provided at the motor 9 of the headstock a tachogenerator 27, the pulses of which are stored in an actual value register 29 for the headstock 2, depending on the function state of the fixing system 13 of the tool holder slide 3 or respectively 13' of the headstock 2. Switching takes place through a symbolically indicated switch 30, which symbolizes the respective operational state of the fixing systems 13, 13', i.e. the fixing system 13 of the tool holder slide is released when switch 30 connects the tachogenerator 27 with the actual value register 28. In this state, the tool holder slide 3 can be moved by rotation of the spherical roller spindle 11, the headstock being clamped to bed 1 by the fixing system 13'. If this fixing system 13' is released, switch 30 will be in the position in which it connects the tachogenerator 27 with the actual-value register 29 for headstock 2. In this operational position the headstock 2 can be moved by rotation of the spherical roller spindle 11, the fixing system 13 of the tool holder slide 3 being clamped relative to the machine bed 1.

Since the length L of the workpiece is entered in the parts program 26 of the control, and the distance of the tool tip from the end of the workpiece is known on the basis of the entered known values $Z_{ref}$ and $Z_w$, it is possible to determine with the computer of the control unit the value of the distance between the tool tip 23 and the workpiece end, which is labeled 31. This value 31 results from $Z_{ref}$-Z-L. If this value is substantially smaller than the distance 25 between the two machine units, the headstock is already in the position in which the workpiece can be clamped and the tool holder slide moved against the workpiece by drive of the motor 9 after the headstock has been clamped to the machine bed. But if, on the contrary, this calculated value for the distance 31 is substantially greater than the distance between the machine units, it is determined in the parts program by the computer present there how often the two machine units 2 and 3 are mutually clamped and moved relatively to each other until these machine units are in the desired operating position referred to the workpiece. The fixing systems are controlled from the parts program 26. As the spherical roller spindle 11 is axially fixed in the headstock 2, by the drive thereof the tool holder slide 3 can be moved against the headstock 2 after the fixing system 13' of the headstock is clamped to the machine bed and the fixing system 13 of the tool holder slide is released, whereas the headstock can be moved away from the tool holder slide after the fixing system 13' of the headstock has been released and the fixing system 13 of the tool holder slide clamped to the machine bed. As the values stored via the tachogenerator 27 in the actual-value registers and representing the displacement path are stored in memory and are delivered to the parts program, the computer present there is able to compute the existing distance of the machine units and of the tool relative to the workpiece and thus to influence the drive motor 9 and the fixing systems in the manner described above until the desired position is reached. The control of the drive motor 9 by the parts program takes place via line 32, the control of the fixing systems 13 and 13' takes place via the lines 33 and 34, the transmission of the signal corresponding to the displacement path starting from the tachogenerator 27 takes place via line 35, and the actual value registers 28 and 29 are connected with the parts program via the lines 36 and 37.

While the foregoing description and drawings represent the preferred embodiments of the present invention, it will be obvious to those skilled in the art that various changes and modifications may be made therein without departing from the true spirit and scope of the present invention.

What is claimed is:

1. In a center drive machine with two center drive headstocks movable on a machine bed and with two tool holder slides movable on the same machine bed, one headstock and one tool holder slide being associated respectively with one machine bed half, the improvement comprising that one headstock and one tool holder slide are respectively movable by a single common drive unit which is disposed on one of said one headstock and one tool holder slide and acts on the other of said one headstock and one tool holder slide, and means for fixing the tool holder slide relative to the machine bed when the headstock is being moved and for fixing the headstock relative to the machine bed when the tool holder slide is being moved.

2. In a center drive machine according to claim 1, wherein said single common drive unit comprises a spherical roller spindle, a nut cooperating with the spherical roller spindle, and a drive motor for generating a rotary motion between the spherical roller spindle and nut.

3. A center drive machine according to claim 2, wherein the drive motor drives the spherical roller spindle.

4. A center drive machine according to claim 2, wherein the drive motor drives the nut.

5. A center drive machine according to claim 1, wherein, for clamping, the headstock and the tool holder slide each have at least one fixing device which is formed as a hydraulically operated bottom strip which engages from below a guide strip formed on the machine bed.

* * * * *